(12) United States Patent
Rakshit

(10) Patent No.: US 11,093,005 B1
(45) Date of Patent: Aug. 17, 2021

(54) VIRTUAL REALITY ROLLABLE DISPLAY DEVICE

(71) Applicant: INTERNATIONAL BUSINESS MACHINES CORPORATION, Armonk, NY (US)

(72) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/866,596

(22) Filed: May 5, 2020

(51) Int. Cl.
*G06F 1/16* (2006.01)
*G06F 3/01* (2006.01)

(52) U.S. Cl.
CPC .......... *G06F 1/1652* (2013.01); *G06F 1/1641* (2013.01); *G06F 3/016* (2013.01)

(58) Field of Classification Search
None
See application file for complete search history.

(56) References Cited

U.S. PATENT DOCUMENTS

| | | |
|---|---|---|
| 9,405,369 B2 | 8/2016 | Modarres |
| 10,223,251 B2 | 3/2019 | Bhageria |
| 10,417,880 B2 | 9/2019 | Heubel |
| 2017/0038830 A1* | 2/2017 | Clement ............... A63F 13/212 |
| 2017/0329488 A1* | 11/2017 | Welker ................ G06F 3/04845 |
| 2017/0329515 A1* | 11/2017 | Clement ................ G06F 3/011 |
| 2018/0181201 A1* | 6/2018 | Grant ..................... G06F 3/013 |
| 2019/0004683 A1* | 1/2019 | Pahud .................. G06F 3/0346 |
| 2019/0050062 A1* | 2/2019 | Chen ........................ G06T 7/70 |
| 2019/0086675 A1* | 3/2019 | Carollo ............. G02B 27/0955 |
| 2019/0298166 A1* | 10/2019 | Smith .................. A61B 3/0091 |
| 2019/0333480 A1* | 10/2019 | Lang ................... G02B 27/017 |
| 2020/0038120 A1* | 2/2020 | Ziraknejad ............ A61B 34/25 |
| 2020/0121235 A1* | 4/2020 | Gibbons ................. A61B 3/11 |
| 2020/0388246 A1* | 12/2020 | Chrapek ............... G09G 5/377 |

OTHER PUBLICATIONS

Disclosed Anonymously, "Method and System for Confidential Information Display by Deforming Local Display Area", https://priorart.ip.com/IPCOM/000254912, Aug. 13, 2018, pp. 1-4.

(Continued)

*Primary Examiner* — Toan H Vu
(74) *Attorney, Agent, or Firm* — John Noh

(57) ABSTRACT

A device has a first configuration as a display device and a second configuration as a virtual reality headset. The device includes a viewable panel and a shape changing panel. The viewable panel is configured to show data to a user in the first configuration and configured to show data as VR content in the second configuration. The shape changing panel is disposed over the viewable panel and is configured to generate surface deformations at selected areas of the shape changing panel. The viewable panel and the shape changing panel have a flexibility for the rollable display to encircle around the head of the user that converts the rollable display from the first configuration to the second configuration. The surface deformations are generated on areas of the shape changing panel corresponding to eyes and a nose of the user.

20 Claims, 6 Drawing Sheets

(56) References Cited

OTHER PUBLICATIONS

Johnston, "Microfluidics Panel Could Add Physical Buttons to a Touch Screen", ARS Technica, https://arstechnica.com/gadgets/2014/01/new-microfluidics-panel-could-add-physical-buttons-to-a-touch-screen/, Jan. 23, 2014, pp. 1-4.
Macrumors, "Phorm Case Adds Morphing Tactile Keyboard to iPad Mini", https://www.macrumors.com/2015/02/12/phorm-morphing-ipad-mini-ke . . . ,printed Feb. 26, 2020, pp. 1-11.
Padia, "Rollable OLED Display with Fingerprint Sensor Patented by Samsung", Android Community, https://androidcommunity.com/rollable-oled-display-with-fingeprint-sensor-patented-by-samsung-20180102/, Jan. 2, 2018, pp. 1-3.
Physics Stack Exchange, "The Power of a Lens and Radious of Curvature Relation", https://physics.stackexchange.com/questions/319576/the-power-of-a-len . . . , printed Feb. 26, 2020 pp. 1-1.
Science Buddies, "The Magnifying Effect of a Water Drop", Bring Science Home, https://www.scientificamerican.com/article/the-magnifying-effect-of-a-w . . . , Jul. 2, 2015, pp. 1-12.
Wikipedia, "Gandhari", https://en.wikipedia.org/wiki/Gandhari, printed May 4, 2020, p. 1.
Yeo et al., "Wearable Tactile Senor Based on Flexible Microfluidics", Lab on a Chip, https://pubs.rsc.org/en/content/articlelanding/2016/1c/c6lc00579a#!divAb . . . , Issue 17, 2016, pp. 1-16.

\* cited by examiner

VIRTUAL REALITY ROLLABLE DISPLAY DEVICE

BACKGROUND

The exemplary embodiments relate generally to a rollable display device, and more particularly to the rollable display device being configured to be converted into a virtual reality (VR) device worn on a head of a user.

A user may utilize a variety of different devices for a variety of different purposes. For example, the user may have a mobile device such as a smartphone. The user may have other devices such as accessories for the smartphone, accessories for an application executed on the smartphone, etc. To properly utilize certain features in an intended manner, the user may be required to have a particular piece of hardware readily available. For example, the user may have a virtual reality (VR) application installed on the smartphone. The VR application may simulate a visual environment for the user in which to view VR content. Accordingly, to utilize the features of the VR application, the user may be required to have a VR headset that is worn over the user's eyes. However, the VR headset is a separate piece of hardware from the smartphone or source that hosts the VR environment and must be within range of the smartphone, often through a wired connection or a near field communication range. The VR headset may also be cumbersome as the VR headset may be relatively large. Accordingly, as more technological features become available and the user being required to have a respective piece of hardware for each technological feature, the user is required to carry and have readily available an increasing number of these individual hardware pieces.

SUMMARY

The exemplary embodiments disclose a device and a method for using a device having a first configuration as a display device and a second configuration as a virtual reality headset. The device comprises a viewable panel including a first side facing away from a head of a user and a second side facing toward the head of the user. The viewable panel is configured to show data to a user in the first configuration and configured to show data as VR content in the second configuration. The device comprises a shape changing panel including a first side facing away from the head of the user and a second side facing toward the head of the user. The shaping changing panel is disposed over the viewable panel where the first side of the shape changing panel is adjacent the second side of the viewable panel. The shape changing panel is configured to generate surface deformations at selected areas of the second side of the shape changing panel. The viewable panel and the shape changing panel have a flexibility for the rollable display to encircle around the head of the user that converts the rollable display from the first configuration to the second configuration. The surface deformations are generated on areas of the shape changing panel corresponding to eyes and a nose of the user.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
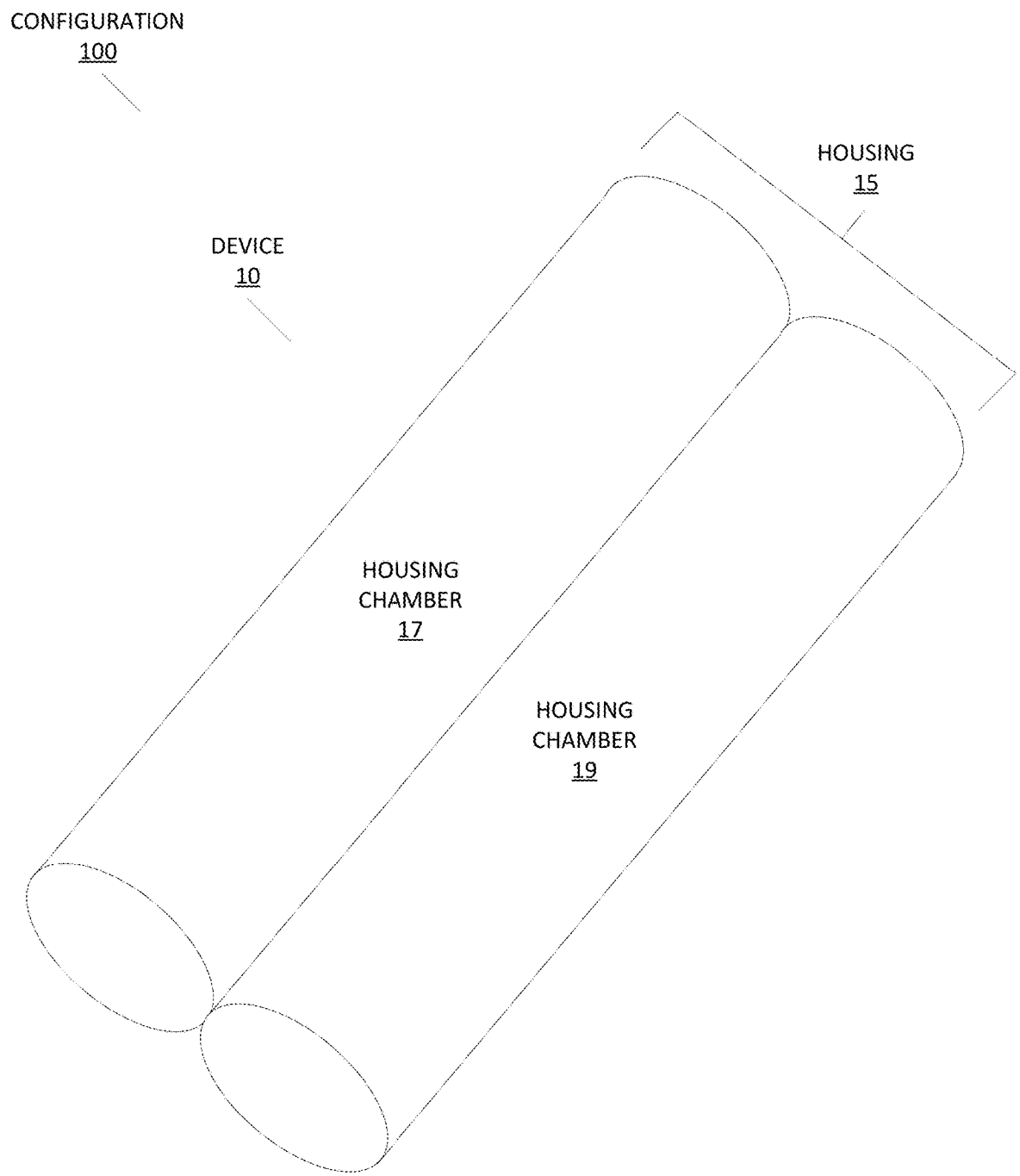
FIG. 1 depicts an exemplary device 10 in a closed configuration, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a device and a method for using a device having a first configuration as a display device and a second configuration as a virtual reality (VR) headset. The device may be multi-purpose by consolidating features provided by otherwise separate hardware units into a single hardware unit. The device may be capable of converting between the first configuration that provides features associated with a display device and the second configuration that provides features associated with a VR headset that is worn on a head of a user. The device may include a rollable display that is adaptable for use as both the display device and the VR headset where the rollable display device includes shape manipulation technology such as microfluidics to conform to features of the user's head and face. Key benefits of the exemplary embodiments may include eliminating a need for a separate VR headset hardware when utilizing VR features when the device is already available. Detailed implementation of the exemplary embodiments follows.

Conventional technologies have been designed to individually provide a display device and a VR headset as separate hardware units. For example, those skilled in the art will understand the plurality of different types of display devices that may be incorporated into a device. In a particular example, a flexible display has been introduced that allows for folding or rolling the display device into a more compact shape when not in use. However, none of these display devices according to conventional technologies are capable of being used in any manner other than as a display device, particularly as a VR headset that may be worn on a user's head, over the user's face. Therefore, the user is required to carry both the display device and the VR headset if both hardware units are to be used.

The exemplary embodiments provide a dual purpose device serving as a display device in a first configuration and a VR headset in a second configuration. According to the exemplary embodiments, the device includes a rollable display that may be incorporated in a mobile device to display data to a user. The rollable display may include a viewable panel and a microfluidics panel disposed thereon where the microfluidics panel has a microfluidics surface deformation capability that converts the rollable display into a VR headset for navigating VR content. With users being required to have more and more separate hardware devices to utilize various technological features such as a mobile phone and a VR headset, the exemplary embodiments alleviate a user's need to carry these multiple hardware devices to have a synergy in a single device. Accordingly, the device according to the exemplary embodiments may be utilized as a mobile device that may be directly converted to a VR headset, and at the same time, the VR headset may be reverted to a mobile device for a user's interaction.

FIGS. 1-5 illustrate a device 10 that may be converted between a display device and a VR headset, in accordance with the exemplary embodiments. For illustrative purposes, in one configuration, the device 10 is described as the display device. However, those skilled in the art will recognize that the device 10 may be configured as the display device that is incorporated into a mobile device or other computing device that utilizes the display device to show data to a user. Accordingly, the description below regarding the device 10 being configured as the display device may also represent the device 10 being used as a mobile device, computing device, etc. As such, the device 10 may include a plurality of one or more operating systems, applications, programs, clients, etc. The device 10 may also be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of utilizing a display device to show data to a user. While the device 10 is shown as a single device, in other embodiments, the device 10 may be comprised of a cluster or plurality of computing devices, in a modular manner, etc., working together or working independently while the device 10 includes at least the display device. The device 10 may also be equipped with data communication technology and be configured to utilize various wired and/or wireless connection protocols for data transmission and exchange, including Bluetooth, 2.4 gHz and 5 gHz internet, near-field communication, Z-Wave, Zigbee, etc. The exemplary embodiments are also described with regard to the device 10 being converted into a VR headset. However, the use of the VR headset is only for illustrative purposes. The VR headset in the description below may represent any VR gadget, a separate hardware unit that is different than the display device, etc.

FIG. 1 depicts the exemplary device 10 in a closed configuration 100, in accordance with the exemplary embodiments. As illustrated, the device 10 may include a housing 15 which has a first housing chamber 17 and a second housing chamber 19. In the closed configuration 100, the first housing chamber 17 and the second housing chamber 19 may be positioned adjacent one another. As will become apparent from the description below, the device 10 in the closed configuration 100 may house components that are fully or partially exposed in an open configuration while other components remain housed in the housing chambers 17, 19 regardless of configuration.

The first housing chamber 17 and the second housing chamber 19 may be equipped with a locking mechanism to maintain the adjacent disposition while the device 10 is in the closed configuration 100. As will be described in detail below, the locking mechanism may also be used when the device 10 is in a wearable configuration which also utilizes an adjacent positioning of the first housing chamber 17 and the second housing chamber 19. The locking mechanism may utilize any manner to achieve the adjacent positioning of the housing chambers 17, 19. For example, the locking mechanism may be a physical lock in which a first locking component (e.g., an arm) on one of the housing chambers 17, 19 locks into a second locking component (e.g., a recess) on the other one of the housing chambers 17, 19. In another example and according to an exemplary implementation of the exemplary embodiments, the locking mechanism may be magnetically based. Thus, when the housing chambers 17, 19 are brought to within a predetermined maximum distance, the magnets of the housing chambers 17, 19 may attract one another to cause the housing chambers 17, 19 to move to the adjacent positioning. Those skilled in the art will appreciate that there may be any number of individual or combinations of locking mechanisms that may be used for the exemplary embodiments for the housing chambers 17, 19 to maintain an adjacent positioning (e.g., such as in the closed configuration 100).

The device 10 having the housing 15 with two separate housing chambers 17, 19 is only for exemplary purposes. Those skilled in the art will appreciate that the housing 15 may be modified to only include a single housing chamber or further housing chambers depending on how the other components of the device 10 are to be used. For example, in the illustrated exemplary embodiment and as will be described in detail below, the device 10 may include a rollable display that is housed in the housing chambers 17, 19 in the closed configuration 100. In the exemplary embodiment, a first end or side of the rollable display may be fixedly attached to the housing chamber 17 while a second, opposite end or side of the rollable display may be fixedly attached to the housing chamber 19. For illustrative purposes, an end and a side may be used interchangeably. In a particular implementation, each housing chamber 17, 19 may include a rolling mechanism therewithin that is configured to retract or wind the rollable display into the respective housing chamber 17, 19 (e.g., a spring biased rolling mechanism). The rolling mechanism may also be controlled (e.g., manually by the user, automatically by a processing unit according to various conditions, etc.). In another example, the rollable display may be housed in only one of the housing chambers 17, 19 while the other one of the housing chambers 17, 19 provides a means to pull the rollable display out. Thus, only one of the housing chambers 17, 19 may include the rolling mechanism. In this implementation, the second end may be fixedly attached in any manner to the housing chamber 19 while the first end may be fixedly attached to the rolling mechanism within the housing chamber 17. In a further example, the housing 15 may include only a single housing chamber that includes a rolling mechanism. Accordingly, a first end of the rollable display may be fixedly attached to the rolling mechanism in a manner substantially similar to the exemplary embodiment including two housing chambers 17, 19. The second, opposite end of the rollable display may be accessible by a user to pull the rollable display out of the single housing chamber.

The housing chambers 17, 19 may be manufactured in a variety of ways to facilitate the various features that the device 10 is to provide. For example, the housing chambers 17, 19 may be substantially hollow so that the rollable display may be housed therewithin in the closed configuration 100. The housing chambers 17, 19 may also house one or more other components (e.g., circuitry, an ICB, a network card, etc.) that is to be protected from exposure. The housing chambers 17, 19 may be made of various materials or combinations thereof such as different types of plastics, different types of metals, etc.

Figure 2:
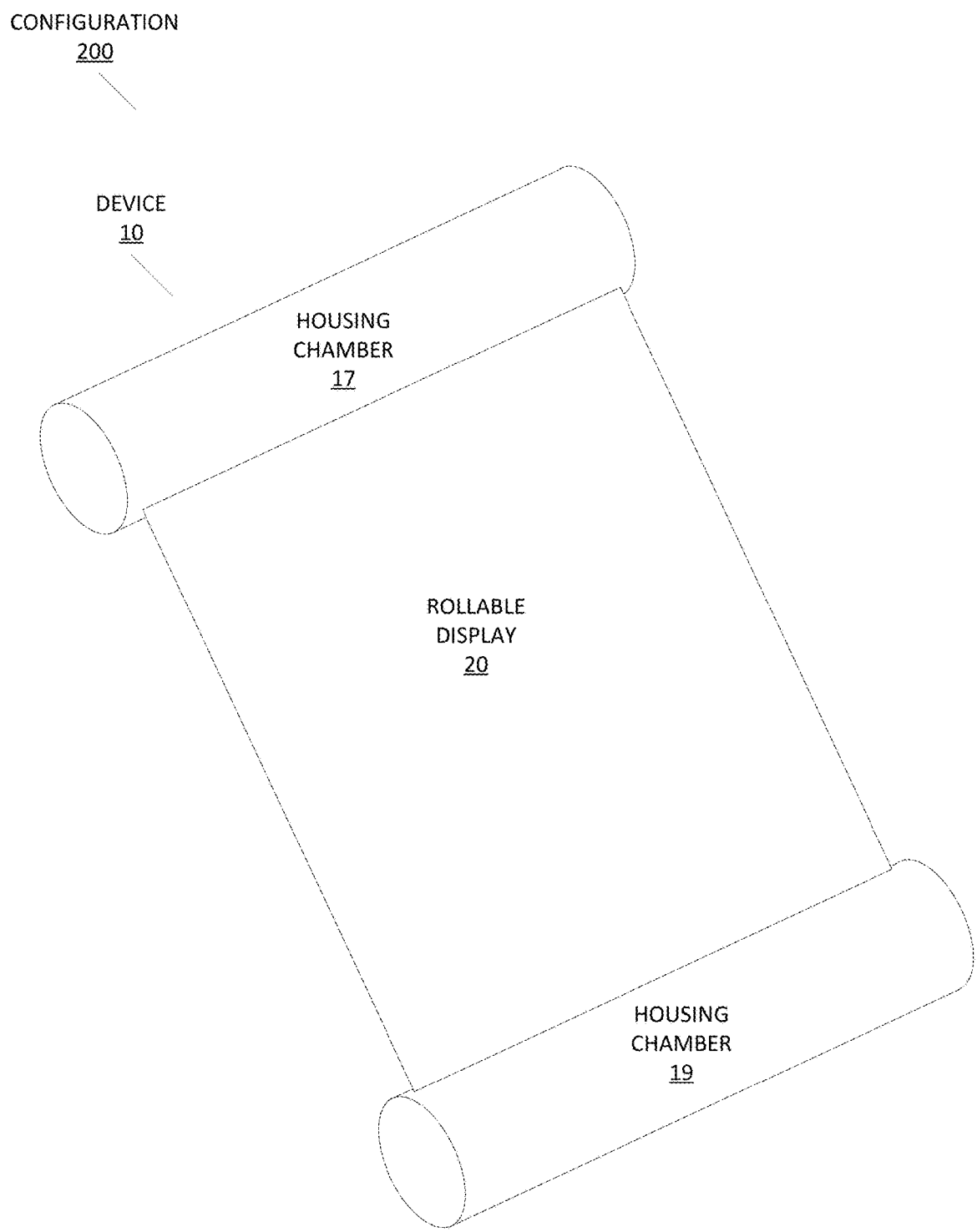
FIG. 2 depicts the exemplary device 10 in an open configuration, in accordance with the exemplary embodiments.

FIG. 2 depicts the exemplary device 10 in an open configuration 200, in accordance with the exemplary embodiments. As illustrated, in the open configuration 200, the first housing chamber 17 and the second housing chamber 19 may be positioned apart from one another (e.g., greater than the predetermined maximum threshold in which the magnetic lock triggers). While the first housing chamber 17 is being separated from the second housing chamber 19, a rollable display 20 may be unwound from a rolled position from within at least one of the first housing chamber 17 and the second housing chamber 19. The user may separate the first housing chamber 17 and the second housing chamber 17 until the open configuration 200 is reached and the rollable display 20 has reached an unrolled position.

To ensure that the rollable display 20 is unwound to a proper length corresponding to the open configuration 200, the device 10 may be equipped with one or more features that provide an indication to the user that the rollable display 20 has been unwound a proper amount. For example, the rolling mechanism may include a stop lock that prevents the rollable display 20 from being unwound beyond the proper amount corresponding to the open configuration 200. As will be described below, if the stop lock is used, a mechanism may be introduced that overrides or releases the stop lock to allow the rollable display 20 from being unwound a greater amount than the amount of the open configuration 200. The user may actuate the mechanism via an input (e.g., a button available on an exterior on one or both the housing chambers 17, 19). In another example, the device 10 may include a sensory feedback to indicate when the proper amount corresponding to the open configuration has been reached. The sensory feedback may be visual (e.g., a light or mechanical unit on at least one of the housing chambers 17, 19 and the rollable display 20 that shows when the proper amount is reached), auditory (e.g., a sound or click is heard when the proper amount is reached), haptic (e.g., an indication is felt when the proper amount is reached), etc.

The rollable display 20 may be any flexible display with a sufficient flexibility that allows the material to be rolled, particularly within a space available within one or both of the housing chambers 17, 19. Furthermore, as will be described in further detail below, the rollable display 20 may include a viewable panel and a microfluidics panel. The microfluidics panel may represent any shape changing panel that is configured to modify a shape in one or more select areas on a surface of the shape changing panel. The viewable panel of the rollable display 20 may utilize any technological specification (e.g., electronic paper based display technology, OLED based display technology, electrophoretic technology, electrowetting technology, etc.). The viewable panel may include a first, exterior side facing away from the head of the user and a second, interior side facing toward the head of the user. The viewable panel of the rollable display 20 may include a circuit board and/or circuit connections such as on a perimeter of an area of the rollable display 20. The areas of the rollable display 20 that include the circuit components may be prevented from being exposed in the open configuration 200 or any other configuration. For example, the circuitry components of the rollable display 20 may be located on the ends of the rollable display 20 that are kept within the housing chambers 17, 19. In another example, the circuitry components of the rollable display 20 may be protected even if exposed such as being embedded in electronic cloth.

The open configuration 200 also shows the first configuration when the device 10 is used as a display device or a mobile device. Thus, in the open configuration 200, a user may utilize the device 10 in a manner consistent with conventional uses of mobile devices. Although the rollable display 20 may be designed with a sufficient flexibility to be rolled into the housing chambers 17, 19, the rollable display 20 may also be designed with a sufficient rigidity to hold a substantially planar shape. For example, the rollable display 20 may be designed with a shape memory that when actuated, provides the sufficient rigidity. In another example, the rollable display 20 may utilize a microfluidics panel that is included in the rollable display 20 to provide the sufficient rigidity (e.g., providing a minimum pressure on the fluid of the microfluidics panel corresponding to the sufficient rigidity). The rollable display 20 may also be configured to be biased toward the substantially planar shape such that when a force applied on the rollable display 20 that deforms the rollable display 20 away from the substantially planar shape is no longer present, the rollable display 20 naturally returns to the substantially planar shape. The rollable display 20 may be configured as a touchscreen to allow the user to enter inputs. In this manner, the device 10 may further incorporate a hardware unit that may otherwise be separate from the device 10. However, the device 10 may also be configured to include or connect to an input device that may be connected to the device 10 in a modular manner.

Figure 3:
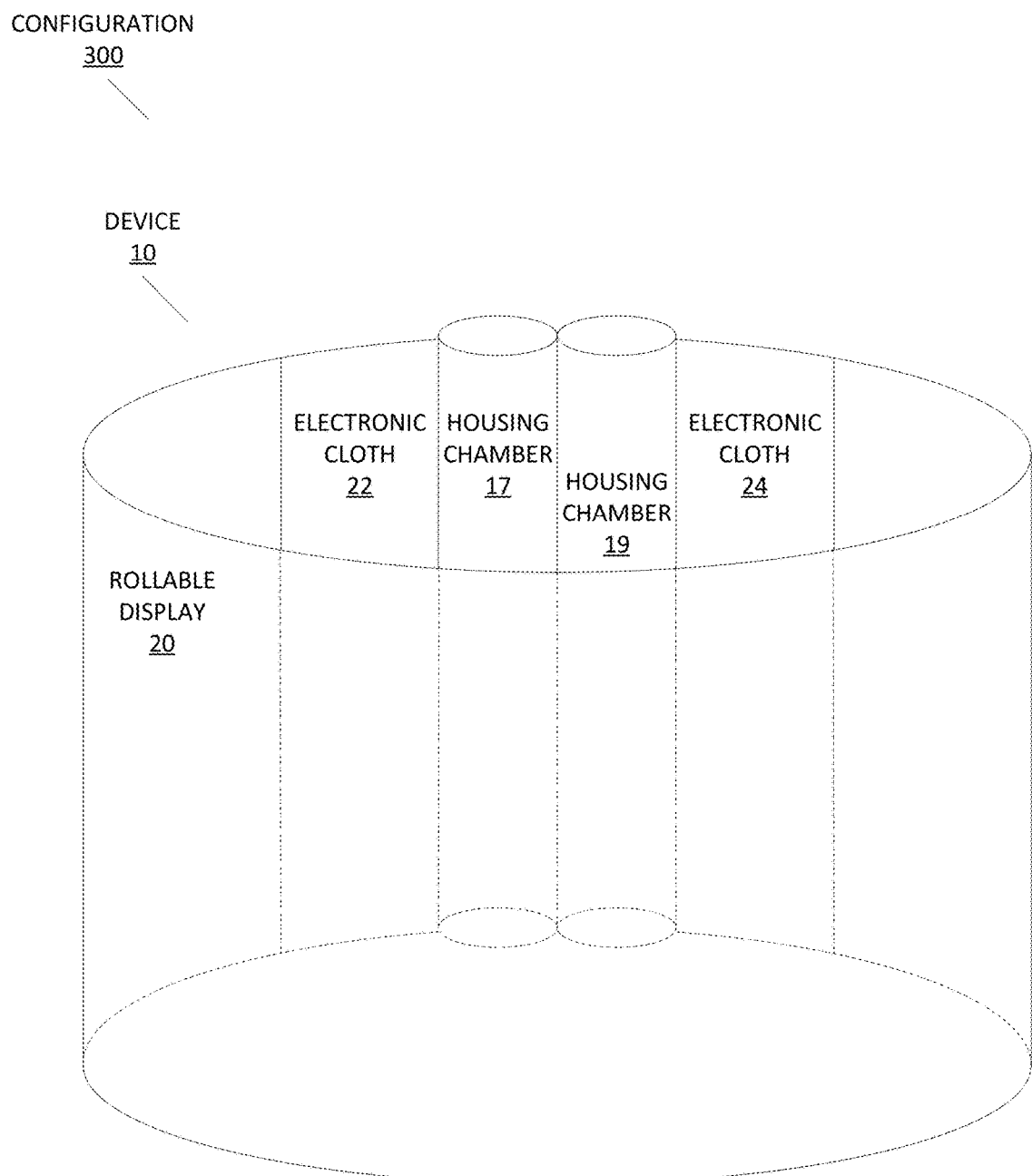
FIG. 3 depicts the exemplary device 10 in a wearable configuration, in accordance with the exemplary embodiments.

FIG. 3 depicts the exemplary device 10 in a wearable configuration 300, in accordance with the exemplary embodiments. The wearable configuration 300 shows the second configuration in which the device 10 may be utilized as a VR headset. As illustrated, the rollable display 20 may be further unwound out of the housing chambers 17, 19 beyond the amount corresponding to the open configuration 200. Furthermore, the device 10 may be encircled around a user's head and covering the user's eyes such that the housing chambers 17, 19 are placed adjacent one another. As described above, the housing chambers 17, 19 may include a locking mechanism (e.g., magnets) that maintain the housing chambers 17, 19 in the adjacent positioning. Accordingly, in the wearable configuration 300, the device 10 may be wrapped around a user's head with the housing chambers 17, 19 positioned at the back of the user's head while an interior surface of the rollable display 20 is positioned around the user's face and covering the user's eyes.

The rollable display 20 may further include an electronic cloth 22 at the first end which is exposed when unwound out of the housing chamber 17 and an electronic cloth 24 at the second, opposite end which is exposed when unwound out of the housing chamber 19. Those skilled in the art will understand the various uses associated with introducing the electronic cloth 22, 24, particularly in the manner shown in the wearable configuration 300. For example, as noted above, the rollable display 20 may include circuitry components at the first and second ends. The electronic cloth 22, 24 may provide a surface on which the circuitry may be embedded and/or protected.

Figure 4:
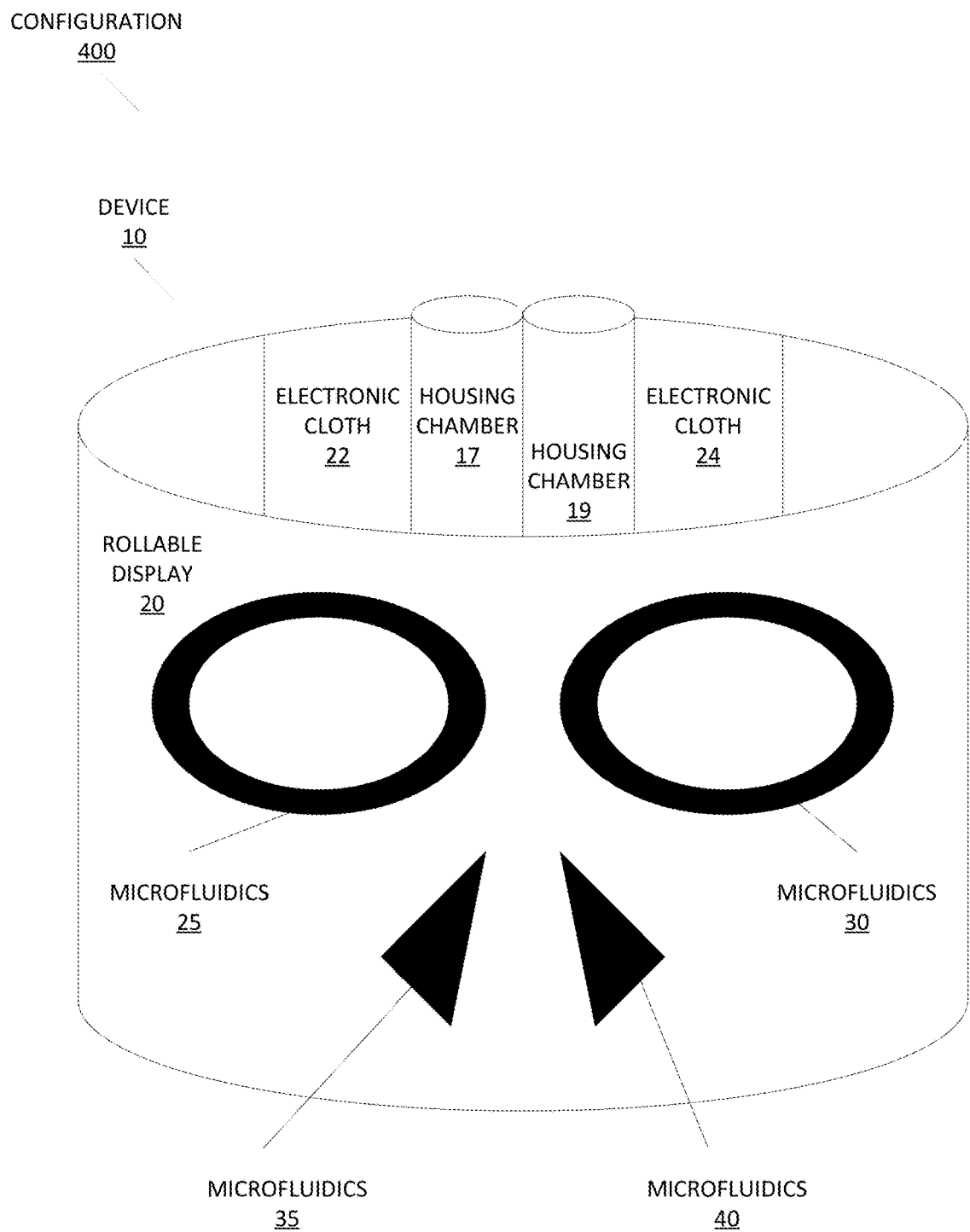
FIG. 4 depicts the exemplary device 10 in a shaped configuration, in accordance with the exemplary embodiments.

FIG. 4 depicts the exemplary device 10 in a shaped configuration 400, in accordance with the exemplary embodiments. The shaped configuration 400 may be substantially similar to the wearable configuration 300 as the shaped configuration 400 may be a modification of the wearable configuration 300. Thus, the housing chambers 17, 19 may be positioned adjacent one another and locked into that disposition. The rollable display 20 may be unwound to an amount greater than the amount corresponding to the open configuration 200. The electronic cloth 22, 24 may also be exposed from the rollable display 20 being unwound to the greater amount.

The shaped configuration 400 may be modified from the wearable configuration 300 by introducing shape conforming features that correspond to facial features of the user's face. For example, the facial features for which the shape conforming features may be created may be for the user's eyes and nose. In creating the shape conforming features, the rollable display 20 may be equipped with shape manipulation technology that allows for the shape conforming features to be created. For example, the rollable display 20 may include shape memory material that, when actuated, creates the shape conforming features. In another example and according to an exemplary implementation of the exemplary embodiments, the rollable display 20 may include microfluidics technology that generates the shape conforming features as microfluidics surface deformations (hereinafter also referred to as "surface deformations" or "microfluidics") which are risen areas on the surface of the microfluidics panel. As illustrated, the rollable display 20 may include four microfluidics surface deformations 25, 30, 35, 40 where the microfluidics 25 and 30 are used to conform to the user's eyes while the microfluidics 35, 40 are used to conform to the user's nose. The manner in which the microfluidics 25, 30, 35, 40 operate and are used will be described in further detail below.

Figure 5:
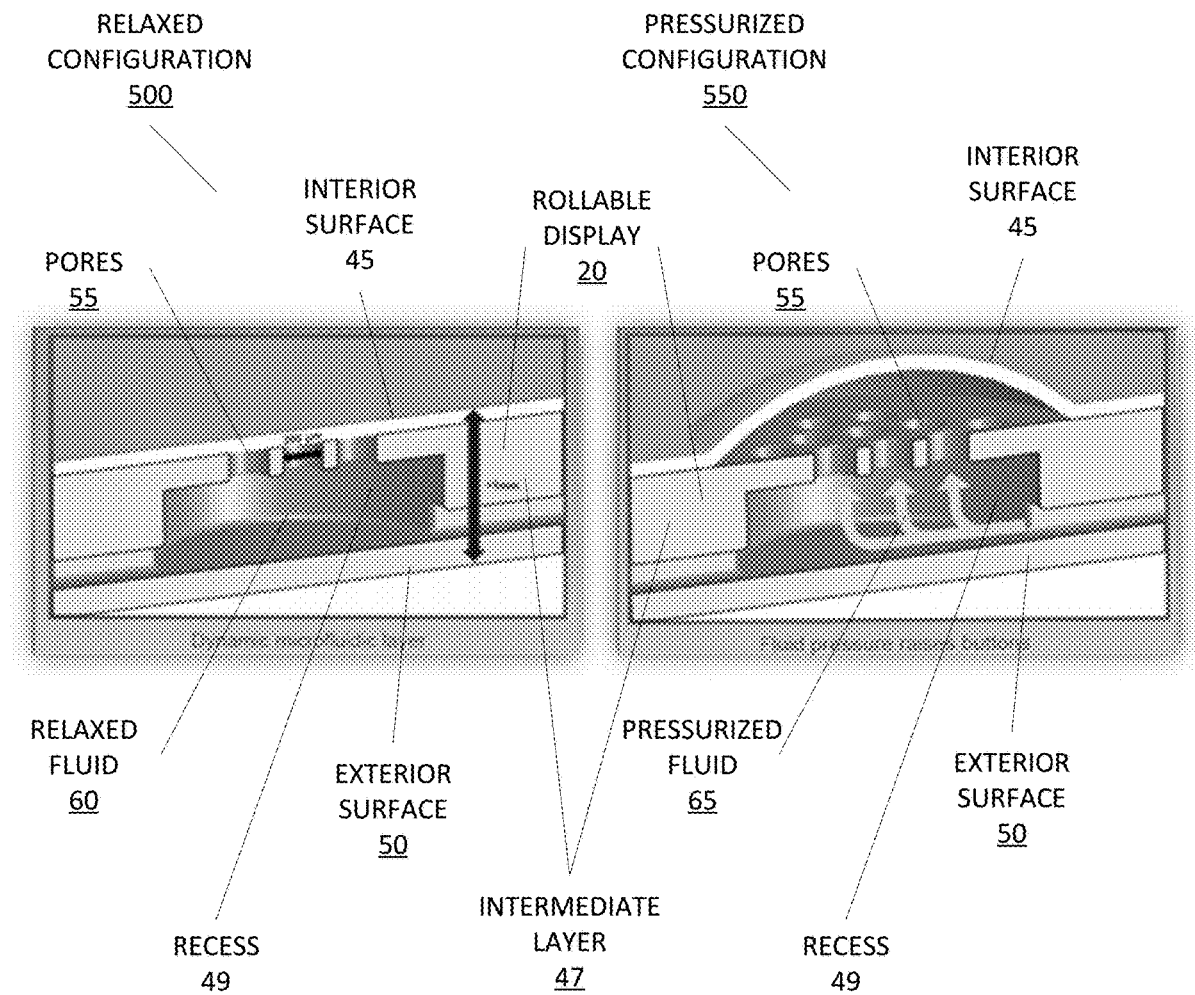
FIG. 5 depicts a relaxed configuration and a pressurized configuration of the exemplary device 10, in accordance with the exemplary embodiments.

FIG. 5 depicts a relaxed configuration 500 and a pressurized configuration 550 of the exemplary device 10, in accordance with the exemplary embodiments. Specifically, the relaxed configuration 500 and the pressurized configuration 550 are directed to portions of the rollable display 20 that include the microfluidics 25, 30, 35, 40. For example, the relaxed configuration 500 and the pressurized configuration 550 may be a cross-sectional view of the microfluidics panel that is disposed over the viewable panel of the rollable display 20. Thus, according to an exemplary implementation, the rollable display 20 may include the microfluidics at strategic locations such as those illustrated in FIG. 4 of the shaped configuration 400 where the strategic locations are for the facial features. In another exemplary implementation, the rollable display 20 may include further areas in which the microfluidics are available (e.g., an entire surface of the rollable display 20) to, for example, allow for a dynamic creation of the microfluidics 25, 30, 35, 40.

The microfluidics of the rollable display 20 may utilize fluid pressure to modify a shape of a surface of the rollable display 20. Thus, in the relaxed configuration 500, a fluid may be under a first amount of pressure that is less than a predetermined threshold that would cause the surface of the rollable display 20 to change shape. For example, the device 10 may introduce additional fluid that is stored and outside a microfluidics panel on the rollable display 20 to increase the fluid pressure of the fluid already in the microfluidics panel. In the pressurized configuration, the fluid may be under a second amount of pressure that is at least the predetermined threshold that causes the surface of the rollable display 20 to change shape. The change in shape may be exhibited on the surface of the rollable display 20 as a bulge or becoming inflated due to the fluid.

As illustrated in FIG. 5, the microfluidics panel of the rollable display 20 may include an interior surface 45 and an exterior surface 50. The interior surface 45 may correspond to an interior that is created from the device 10 encircling and converting into the VR headset under the second configuration corresponding to the shaped configuration 400 or the wearable configuration 300. According to the exemplary embodiments, the interior surface 45 may be configured to include the microfluidics surface deformations while the exterior surface 50 substantially maintains a surface structure such as a smooth profile. Lying between the interior surface 45 and the exterior surface 50 may be an intermediate layer 47. The intermediate layer 47 may include a fluid channel in which the fluid for the microfluidics panel may be held. The intermediate layer 47 may also include a recess 49 that corresponds to a location of a portion of the intermediate layer 47 in which the microfluidics surface deformation may occur. At the location of the recess 49, the intermediate layer 47 may include pores 55 such that fluid that is pressurized is relieved by the pores 55 to result in the microfluidics surface deformation. As shown in the relaxed configuration 500, the channel and the recess 49 of the intermediate layer 47 may hold relaxed fluid 60 which has a pressure that is under the predetermined threshold that would create the microfluidics surface deformation. However, as shown in the pressurized configuration 550, the channel and the recess 49 of the intermediate layer 47 may hold pressurized fluid 65 which has a pressure that is at least the predetermined threshold. Therefore, the portion of the interior surface 45 at the location of the recess 49 and the pores 55 may have a surface deformation. Further pressure to the pressurized fluid 65 may impact a degree to which the surface deformation is raised.

In a particular implementation of the microfluidics, the rollable display 20 may have a microfluidics panel on the viewable panel of the rollable display where the exterior surface 50 is adjacent the viewable panel and the interior surface 45 is on an opposite, exposed end. The microfluidics display layer may include an elastic thin membrane (e.g., on the interior surface 45) with an array of fluid ports (e.g., pores 55) that are configured to raise the height of the membrane when fluid pressure is applied programmatically (e.g., resulting in the pressurized fluid 65). Placement of the elastic and flexible microfluidics membrane layer over the surface of the rollable display 20 may retain the rollable capability of the rollable display 20. For example, when the fluid is de-pressurized, the rollable display 20 may exhibit the required flexibility. Using the array of fluid ports, the microfluidics may utilize a valve-controlled movement of transparent fluid through the microfluidics panel. Accordingly, when appropriate pressure is applied on the fluid at the target port of the microfluidics port, and, based on the additional pressure, the surface of the microfluidics may rise. Thus, upon identifying a position of the eyes of the user, the microfluidics module may raise particular areas around the position of the eyes to separate the rollable display 20 from the eyes. The microfluidics module may also raise a further area in front of the eyes as lenses to create a lens effect. The lens effect may correspond to a water droplet lens effect in which the curvature of the surface raised profile creates the appropriate lens effect for viewing of the VR content. Those skilled in the art will appreciate that the power of the lens depends on the radius and curvature. In this manner, the device 10 may use the microfluidics programmatically to control the alteration to the lens power dynamically. For example, the lens effect may be determined in which an inverse of a focal length is equal to a product of a refractive index less one and a difference of an inverse of a first radius of curvature and an inverse of a second radius of curvature.

Returning to the shaped configuration 400 of FIG. 4, with the pressurized fluid 65, the microfluidics 25, 30, 35, and 40 may exhibit surface deformations. For example, for the microfluidics 25 and 30, the surface deformations may be rings that are raised around the user's eyes. In this manner, the portion of the rollable display 20 that is over the user's eyes may be separated from the user's eyes to a sufficient degree for VR content to be viewed properly. The microfluidics 25 and 30 may also be raised to a degree for an interior area of the ring resulting from the microfluids 25 and 30 to form a lens that provides a visual interaction with the VR environment. For the microfluidics 35, and 40, the surface deformations may be nose grips to prevent the device 10 from sliding down the user's face. It is noted that the illustration of FIG. 4 is intended to show the microfluidics 25, 30, 35, and 40 that are in the interior of the device 10 (e.g., surface deformations on the interior surface 45 of the rollable display 20).

According to the exemplary embodiments, the rollable display 20 may be expanded to wrap around the eyes of the user to convert the device 10 from a display device in the first configuration to a VR headset in the second configuration so that the user may navigate VR content. When the user wraps the device 10 around the eyes, the rollable display 20 may be configured to identify the position of the eyes relative to the rollable display 20 that is now covering that portion of the user's face. Using the microfluidics capability, the interior surface 45 of the rollable area that is around the eyes may be deformed to create a required depth and gap between the eyes and the rollable display 20 such that the VR content may be displayed. As a further feature, the portion within the interior of the rings of the surface deformation of the microfluidics 25 and 30 may also be deformed to create a lens for the user to properly view the VR content. Furthermore, using the microfluidics capability of the rollable display 20, the device 10 may deform the interior surface 45 around the nose area to create a nose resting surface via the microfluidics 35, 40. In addition, the edges of the housing chambers 17, 19 may apply a magnetic lock when the device 10 is wrapped round the head of the user and covering the eyes. The magnetic lock may ensure that the converted VR headset does not release from the user's head. The device 10 may further be configured to measure the dimensions of the user's head to identify a required level of tightness while wrapping around the head and covering the eyes. The lock may be applied on the expanded portion, so that the converted VR device is not loose fitting. For example, the rolling mechanism within the housing chambers 17, 19 may be actuated for a snug fitting of the device 10 around the user's head. When the user is done utilizing the device 10 as the VR headset (e.g., the user unlocks the device 10 by separating the housing chambers 17, 19), the microfluidics surface deformations will be removed such that the interior surface 45 reverts from the pressurized configuration 550 to the relaxed configuration 500 and the rollable display 20 may be retracted into the housing chambers 17, 19 to revert the device 10 into the open configuration 200 in which the device 10 is used as a display device or a mobile device.

Figure 6:
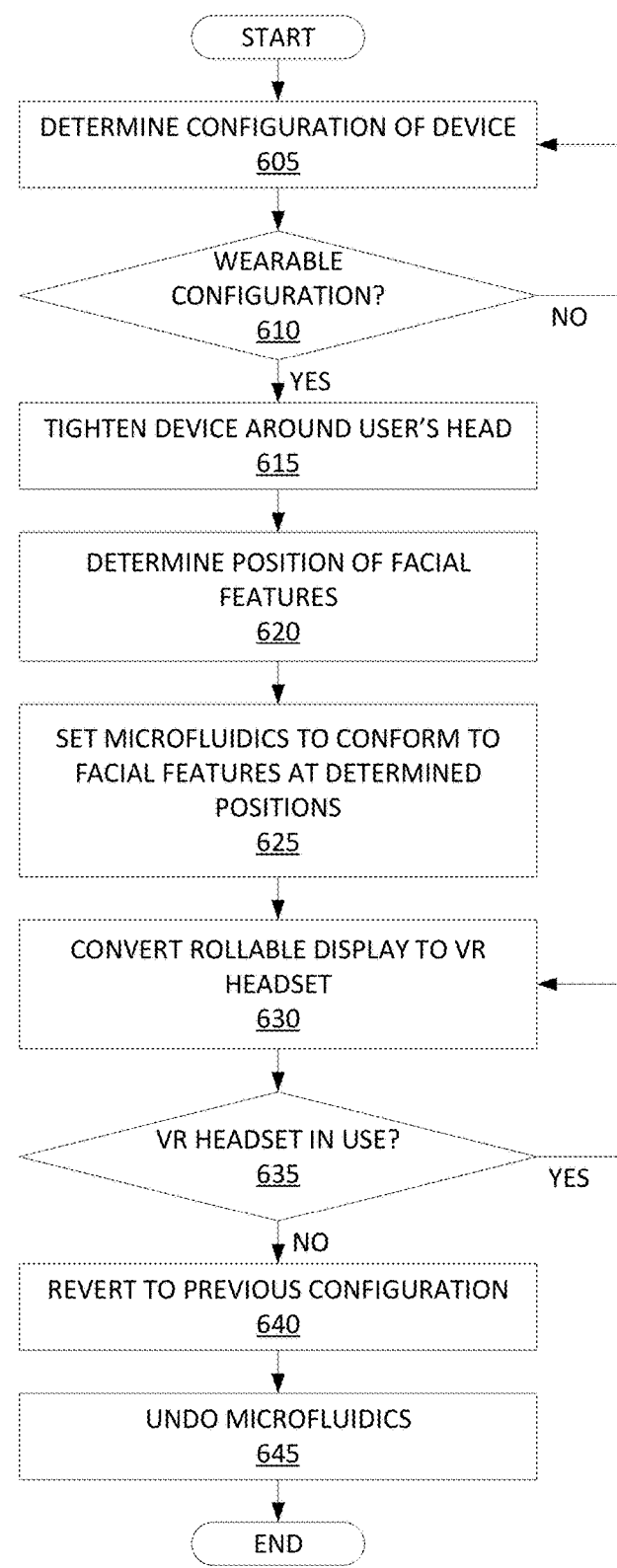
FIG. 6 depicts an exemplary flowchart of a method illustrating the operations of the device 10 in converting from a first configuration to a second configuration in which the device 10 is used as a virtual reality headset, in accordance with the exemplary embodiments.

FIG. 6 depicts an exemplary flowchart of a method 600 illustrating the operations of the device 10 in converting from the closed configuration 100 to the first configuration (e.g., the open configuration 200) and also to the second configuration (e.g., the wearable configuration 300 and the shaped configuration 400) in which the device 10 is used as a VR headset, in accordance with the exemplary embodiments. The method 600 will be described from the perspective of the device 10, in particular a processing unit that performs the various operations involved in converting the device 10 into the proper positioning and configuration.

The device 10 may determine a configuration of the device 10 (step 605). The device 10 may be capable of being a plurality of different configurations. For example, the device 10 may be in the closed configuration 100, the open configuration 200, or the wearable configuration 300 where the shaped configuration 400 is a modification of the wearable configuration 300. Thus, depending on the configuration, the device 10 may take appropriate actions. As the method 600 is directed toward when the device 10 is being used in the second configuration where the device 10 is being used as a VR headset, the device 10 may determine whether the device 10 is in the wearable configuration 300 (decision 610). The device 10 being in a particular configuration may provide an indication as to an intent with regard to how the device 10 is to be used. As a result of the device 10 being in the closed configuration 100 or the open configuration 200 (decision 610, "NO" branch), the device 10 may continue to monitor the configuration. As a result of the device 10 being in the wearable configuration 300 (decision 610, "YES" branch), the device 10 may perform subsequent operations.

In an exemplary embodiment, the device 10 may start in the closed configuration 100. In the closed configuration 100, the rollable display 20 may be housed inside the housing 15 that includes the housing chamber 17 and the housing chamber 19. In the exemplary embodiment, each of the housing chambers 17, 19 may include a rolling mechanism housed therein in which the rollable display 20 may be wound. For example, the rolling mechanism may include an axle and a spring loaded mechanism that is biased to wind the rollable display 20 around the axle. In another example, the rolling mechanism may include a mechanical gear that is controlled to wind or unwind the rollable display 20.

In the closed configuration 100, the housing chambers 17, 19 may be positioned next to one another and be locked to one another. In the exemplary embodiment, each of the housing chambers 17, 19 may include a magnetic lock and a corresponding magnetic lock. The magnetic locks may be a physical lock in which a magnetic field is required for unlocking and locking. Thus, when the housing chambers 17, 19 are brought to within a predetermined maximum distance from one another, the magnetic lock may trigger and lock the housing chambers 17, 19 to be locked in the adjacent positioning.

The device 10 may initially be opened from the closed configuration 100 to the open configuration 200. In the open configuration 200, the device 10 may be used in a substantially similar manner as a mobile device where the rollable display 20 serves to display data to a user and/or enable inputs to be entered. In placing the device 10 in the open configuration 200, the device 10 may include locks that allow the rollable display 20 to be unwound to a predetermined length. Should the rollable display 20 require further unwinding, the lock may be released through various unlocking mechanisms.

If the user wants to use the device 10 as a VR headset, the user may convert the device 10 from the open configuration 200 to the wearable configuration 300 by holding the device 10 near the user's eyes and wrapping the device 10 around the head to cover the eyes. The user may hold the housing chambers 17, 19 and encircle the device 10 around the user's head. When the housing chambers 17, 19 are brought to within the predetermined maximum distance behind the user's head, the magnetic lock may trigger to lock the device 10 around the user's head. According to the exemplary embodiments, the rollable display 20 may have a width (e.g., a length perpendicular to an axis extending between the housing chambers 17, 19) that is a predetermined length that corresponds to a minimum length based on a distance from a bottom of a user's forehead (e.g., to ensure the eyes are covered) to a bottom of the user's nose (e.g., with enough clearance to not cover the user's nostrils).

According to the exemplary embodiments, the rollable display 20 may have a touch sensor across an entire display surface. For example, the touch sensor may be incorporated in the viewable panel, adjacent the viewable panel on either side but not adjacent the interior surface 45 of the microfluidics panel, etc. The touch sensor may be used to provide various types of information. For example, the touch sensor may indicate a relative shape of the rollable display 20. As a result of the rollable display 20 being rolled up such as inside the housing chambers 17, 19, the touch sensor may indicate the rolled up shape which is indicative of the device 10 being in the closed configuration 100. As a result of the rollable display 20 being substantially planar such as when unwound from the housing chambers 17, 19, the touch sensor may indicate the planar shape which is indicative of the device 10 being in the open configuration 200. As a result of the rollable display 20 being substantially encircled into a cylinder, the touch sensor may indicate the encircled shape which is indicative of the device 10 being in the wearable configuration 300.

When the device 10 is in the wearable configuration 300, the device 10 may tighten the device 10 around the user's head (step 615). The tightening of the device 10 around the user's head may ensure that the device 10 stays in place over the user's eyes. Further operations may be performed to improve the manner in which the device 10 stays in a proper position.

When the user decides to use the device 10 as a VR headset, the user may start to wrap the device 10 around the user's head to cover the user's eyes. For example, the user may place the device 10 while in the open configuration 100 and continue to further unwind the rollable display 20. The user may extend the rollable display 20 until the housing chambers 17, 19 are positioned behind the user's head. When the housing chambers 17, 19 are positioned within the predetermined maximum threshold, the magnetic lock may trigger to lock the housing chambers 17, 19 to one another. As described above, the touch sensor may indicate that the rollable display 20 is in a curved disposition thereby indicating that the device 10 is intended to be used as the VR headset. For example, a processing unit of the device 10 may initiate a VR application that shows VR content to the user.

When the device 10 is determined to be used as the VR headset, the device 10 may be modified from the wearable configuration 300 to the shaped configuration 400. For example, based on the dimensions of the head, the rollable display 20 may apply a lock on the surface of the rollable display 20 so that the converted VR headset is not loosely fitting on the user's head. For example, the touch sensor may further provide a tension that is being applied on the rollable display 20. As a result of the tension being less than a predetermined minimum tension threshold, the device 10 may increase a tightness that improves how well the device 10 will stay on the user's head at a desired position. Therefore, the predetermined minimum tension threshold may be selected for the purpose of maintaining the device 10 on the user's head at an intended position. In contrast, as a result of the tension being greater than a predetermined maximum tension threshold, the device 10 may decrease a tightness that improves a comfort of the device 10 being worn on the user's head. Therefore, the predetermined maximum tension threshold may be selected for the purpose of maintaining a level of comfort for the user in using the device 10 as the VR headset. Accordingly, the device 10 may be tightened around the user's head between the predetermined minimum tension threshold and the predetermined maximum tension threshold. When the device 10 has been wrapped around the head of the user and the level of tightness is appropriate, the device 10 may apply a lock on the rollable display 20 such that the rollable display 20 will not be unwound or loosened any further.

With the device 10 tightened around the user's head, the device 10 may determine the position of facial features on the user's face (step 620). The position of the facial features may provide information as to the manner in which to modify the device 10 from the wearable configuration 300 to the shaped configuration 400.

The touch sensor may also be used to identify contact points where the rollable display 20 is touching portions of the user's face, in particular the microfluidics panel that is contacting the user's face. Based on the positions of the contact points, the position of the facial features of the user's face may be identified such as the eyes and the nose. With the device 10 properly placed on the user's head, the touch sensor may be used to determine the portions that are in contact with the user's face to identify the various facial features. For example, as the nose protrudes outward from the user's face, the touch sensor may identify the area with the greatest tension as the tip of the user's nose. In another example, the touch sensor may identify the eyes as a recessed area relative to a brow and the nose. Based on these patterns of the areas on the rollable display 20 that contacts the face of the user, the device 10 may modify the rollable display 20 from the wearable configuration 300 to the shaped configuration 400.

Based on the position of the facial features of the user's face, the device 10 may set microfluidics to conform to the facial features at determined positions (step 625). As described above, the rollable display 20 may include a microfluidics panel that may be used to modify an interior surface 45 of the rollable display into various shapes through pressurizing fluid that flows through the microfluidics panel.

According to the exemplary embodiments, the rollable display 20 may utilize microfluidics when converted into the VR headset. The fluid for the microfluidics may be stored in containers housed within the housing chambers 17, 19. Thus, as fluid from the containers are pushed or pressurized into the microfluidics panel of the rollable display 20, the rollable display 20 may exhibit surface deformations at selected areas along the surface.

Based on the position of the nose, the device 10 may apply pressure to the fluid in the microfluidics panel so that the interior surface 45 of the rollable display 20 may exhibit corresponding surface deformations directed toward the nose. The surface deformations may be nose rests (e.g., microfluidics 35, 40) that further aid in preventing the device 10 from sliding down the user's face while the device 10 is being used as the VR headset.

With the nose rest created, the device 10 may further modify the rollable display 20. Based on the position of the eyes, the device 10 may apply pressure to the fluid in the microfluidics panel so that the interior surface 45 of the rollable display 20 may exhibit additional corresponding surface deformations directed toward the eyes. The surface deformations may be eye rings (e.g., microfluidics 25, 30) that create a sufficient distance between the rollable display 20 and the eyes of the user so that the VR content may be properly viewed. The device 10 may modify the rollable display 20 even further by creating a surface deformation within the eye rings to create a lens effect.

Once the device 10 has been modified from the wearable configuration 300 to the shaped configuration 400 with the microfluidics in place, the device 10 may convert the rollable display 20 into the VR display in which VR content is shown to the user (step 630). At this stage, the device 10 may have completed its conversion into the VR headset. Thus, the user may interact with the VR system.

While the device 10 is being used as the VR headset, the device 10 may monitor whether the VR headset is still in use (decision 635). As a result of the device 10 still in use as the VR headset (decision 635, "YES" branch), the device 10 continues monitoring the use. As a result of the device 10 no longer being used as the VR headset (decision 635, "NO" branch), the device 10 may begin operations to revert the device 10 from the shaped configuration 400 to the wearable configuration 300 and then to the open configuration 200 (step 640). In a particular operation, the device 10 may undo the microfluidics that were used in modifying the wearable configuration 300 into the shaped configuration 400 (step 645).

According to the exemplary embodiments, the device 10 may be configured to identify when the device 10 is no longer being used as the VR headset in the second configuration. For example, the user may unlock the magnetic lock of the housing chambers 17, 19 by separating the housing chambers 17, 19 from one another. The device 10 may be configured to determine when the housing chambers 17, 19 have been unlocked to indicate that the VR headset is no longer in use. In another example, the user may unlock the magnetic lock of the housing chambers 17, 19 and the touch sensor may determine that the rollable display 20 is reverting to its biased planar shape. The device 10 may be configured to determine that the rollable display 20 being naturally biased to indicate that the VR headset is no longer in use.

Upon determining that the VR headset is no longer in use, the device 10 may relax the pressure being applied to the fluid that creates the surface deformations via the microfluidics panel. Thus, the surface deformations may be removed and the interior surface 45 may return to the substantially flat profile. In this manner, the device 10 may revert from the shaped configuration 400 to the wearable configuration 300. The rollable display 20 may also start to wind into the housing chambers 17, 19 such that the device 10 reverts from the wearable configuration 300 to the open configuration 200. If the user chooses, the user may also indicate that the device 10 is to revert from the open configuration 200 to the closed configuration 100. For example, the device 10 may be equipped with an input (e.g., on the rollable display 20, on one of the housing chambers 17, 19, etc.) that, when entered, actuates the rolling mechanisms for the rollable display 20 to be wound into the housing chambers 17, 19 until the housing chambers 17, 19 reach the predetermined minimum distance for the magnetic lock to be triggered.

The exemplary embodiments provide a device that may be placed into a plurality of different configurations and provide respective features associated with a plurality of different hardware units. Specifically, the device may be configured to be used as a mobile device including a display device and a VR headset. When placed into a first configuration in which the display device is exposed, the device may be used as the mobile device. When placed around a user's head into a second configuration in which the device encircles the user's head, the device may be used as the VR headset.

It will be apparent to those skilled in the art that various modifications may be made in the present invention, without departing from the spirit or scope of the invention. Thus, it is intended that the present invention cover modifications and variations of this invention provided they come within the scope of the appended claims and their equivalent.

The invention claimed is:

1. A rollable display having a first configuration as a display device and a second configuration as a virtual reality (VR) headset, the device comprising:
   a viewable panel including a first side facing away from a head of a user and a second side facing toward the head of the user, the viewable panel configured to show data to a user in the first configuration and configured to show data as VR content in the second configuration; and
   a shape changing panel including a first side facing away from the head of the user and a second side facing toward the head of the user, the shaping changing panel disposed over the viewable panel where the first side of the shape changing panel is adjacent the second side of the viewable panel, the shape changing panel configured to generate surface deformations at selected areas of the second side of the shape changing panel,
   wherein the viewable panel and the shape changing panel have a flexibility for the rollable display to encircle around the head of the user that converts the rollable display from the first configuration to the second configuration, wherein the surface deformations are generated on areas of the shape changing panel corresponding to eyes and a nose of the user.

2. The rollable display of claim 1, wherein the shape changing panel is a microfluidics panel.

3. The rollable display of claim 2, wherein fluid within the microfluidics panel is pressurized to generate the surface deformations as risen areas.

4. The rollable display of claim 1, wherein the surface deformations for the nose are nose grips.

5. The rollable display of claim 1, wherein the surface deformations for the eyes are rings around the eyes.

6. The rollable display of claim 5, wherein the surface deformations for the eyes are lenses within the rings.

7. The rollable display of claim 1, further comprising:
a touch sensor configured to indicate contact portions of the surface changing panel that contacts a face of the user, wherein the surface deformations are generated based on the contact portions.

8. The rollable display of claim 7, wherein the touch sensor is further configured to determine a shape of the rollable display indicative of an intent to use the rollable display in one of the first configuration or the second configuration.

9. The rollable display of claim 1, wherein the viewable panel and the shape changing panel have a rigidity for the rollable display to be biased toward a substantially planar profile.

10. The rollable display of claim 1, wherein the rollable display is the display device for a mobile device while in the first configuration.

11. A method, comprising:
determining a configuration of a rollable display, the rollable display having a first configuration as a display device and a second configuration as a virtual reality (VR) headset, the rollable device comprising a viewable panel including a first side facing away from a head of a user and a second side facing toward the head of the user and a shape changing panel including a first side facing away from the head of the user and a second side facing toward the head of the user, the viewable panel configured to show data to a user in the first configuration and configured to show data as VR content in the second configuration, the shaping changing panel disposed over the viewable panel where the first side of the shape changing panel is adjacent the second side of the viewable panel, the shape changing panel configured to generate surface deformations at selected areas of the second side of the shape changing panel, the viewable panel and the shape changing panel have a flexibility for the rollable display to encircle around the head of the user that converts the rollable display from the first configuration to the second configuration; and
as a result of determining that the rollable device is in the second configuration, generating surface deformations on areas of the shape changing panel corresponding to eyes and a nose of the user.

12. The method of claim 11, wherein the shape changing panel is a microfluidics panel.

13. The method of claim 12, further comprising:
pressurizing fluid within the microfluidics panel to generate the surface deformations as risen areas.

14. The method of claim 11, further comprising:
generating the surface deformations for the nose as nose grips.

15. The method of claim 11, further comprising:
generating the surface deformations for the eyes as rings around the eyes.

16. The method of claim 15, further comprising:
generating the surface deformations for the eyes as lenses within the rings.

17. The method of claim 11, further comprising:
indicating contact portions of the surface changing panel that contacts a face of the user via a touch sensor of the rollable display, wherein the generating the surface deformations is based on the contact portions.

18. The method of claim 17, further comprising:
determining a shape of the rollable display via the touch sensor indicative of an intent to use the rollable display in one of the first configuration or the second configuration.

19. The method of claim 11, wherein the viewable panel and the shape changing panel have a rigidity for the rollable display to be biased toward a substantially planar profile.

20. A device, comprising:
a housing comprising a first housing chamber and a second housing chamber; and
a rollable display configured to be wound within at least one of the first and second housing chambers, the rollable display having a first configuration as a display device and a second configuration as a virtual reality (VR) headset, the rollable display comprising a viewable panel including a first side facing away from a head of a user and a second side facing toward the head of the user and a shape changing panel including a first side facing away from the head of the user and a second side facing toward the head of the user, the viewable panel configured to show data to a user in the first configuration and configured to show data as VR content in the second configuration, the shaping changing panel disposed over the viewable panel where the first side of the shape changing panel is adjacent the second side of the viewable panel, the shape changing panel configured to generate surface deformations at selected areas of the second side of the shape changing panel,
wherein the viewable panel and the shape changing panel have a flexibility for the rollable display to encircle around the head of the user that converts the rollable display from the first configuration to the second configuration,
wherein the surface deformations are generated on areas of the shape changing panel corresponding to eyes and a nose of the user.

* * * * *